United States Patent

Anderson et al.

[11] Patent Number: 5,509,322
[45] Date of Patent: Apr. 23, 1996

[54] SHIFT CONTROL MECHANISM TO MANUALLY SHIFT AN AUTOMATIC TRANSMISSION

[75] Inventors: Arthur Anderson, Clarkston; Michael F. Donoughe, Rochester Hills, both of Mich.

[73] Assignee: Chrysler Corporation, Auburn Hills, Mich.

[21] Appl. No.: 253,014

[22] Filed: Jun. 2, 1994

[51] Int. Cl.⁶ .................................................. F16H 59/00
[52] U.S. Cl. .......................................... 74/335; 74/473 R
[58] Field of Search ............................... 74/335, 473 R, 74/479, 475; 267/150

[56] References Cited

U.S. PATENT DOCUMENTS

| | | | |
|---|---|---|---|
| 4,612,820 | 9/1986 | Behrens | 74/475 |
| 4,633,987 | 1/1987 | Rogner et al. . | |
| 4,646,582 | 3/1987 | Kijima . | |
| 4,784,007 | 11/1988 | Ishida et al. . | |
| 4,905,530 | 3/1990 | Stehle et al. . | |
| 4,960,008 | 10/1990 | Yen et al. . | |
| 4,964,318 | 10/1990 | Ganoung . | |
| 4,987,792 | 1/1991 | Mueller et al. . | |
| 5,009,128 | 4/1991 | Seidel et al. . | |
| 5,044,220 | 9/1991 | Raff et al. . | |
| 5,044,221 | 9/1991 | Suzuki et al. . | |
| 5,056,376 | 10/1991 | Moroto et al. . | |
| 5,062,314 | 11/1991 | Maier et al. . | |
| 5,070,740 | 12/1991 | Giek et al. . | |
| 5,079,966 | 1/1992 | Ishizuki et al. | 74/473 R |
| 5,150,633 | 9/1992 | Hillgartner . | |
| 5,156,243 | 10/1992 | Aoki et al. . | |
| 5,161,422 | 11/1992 | Suman et al. . | |
| 5,178,042 | 1/1993 | Moroto et al. . | |
| 5,197,344 | 3/1993 | Maier et al. . | |
| 5,207,124 | 5/1993 | Anderson et al. . | |
| 5,406,860 | 4/1995 | Easton et al. | 74/473 R |

OTHER PUBLICATIONS

TRANSPORTATION ELECTRONICS: PROCEEDINGS OF THE INTERNATIONAL CONGRESS ON TRANSPORTATION ELECTORNICS; *Electronically Controlled Mechanical Automatic Transmission for Heavy Duty Trucks and Buses;* By Tanka et al.; pp. 161–170.

*Primary Examiner*—Charles A. Marmor
*Assistant Examiner*—Peter Kwon
*Attorney, Agent, or Firm*—Thomas G. Pasternak

[57] ABSTRACT

A shift control mechanism for an automatic transmission includes a housing having a shift control pattern with a longitudinal portion defining a plurality of automatic transmission operating settings and a transverse portion at one end of the longitudinal portion defining a plurality of manual transmission operating settings, shift lever structure being manually moved along the shift control portion for selecting the automatic transmission operating settings and for selecting the manual transmission operating settings, and a switch assembly actuated by moving the shift lever structure in a first direction in the transverse portion to send a signal to manually upshift the automatic transmission and a second direction in the transverse portion opposite the first direction to send a signal to manually downshift the automatic transmission.

16 Claims, 3 Drawing Sheets

SHIFT CONTROL MECHANISM TO MANUALLY SHIFT AN AUTOMATIC TRANSMISSION

BACKGROUND OF THE INVENTION

1. Field of the Invention

The present invention relates generally to shift control mechanisms for transmissions and, more particularly, to a shift control mechanism to manually shift an automatic transmission.

2. Description of the Related Art

Automotive vehicles require a power train to transmit the force of an engine to wheels of the vehicle. The power train's main component is typically referred to as the "transmission". Engine torque and speed are converted in the transmission in accordance with the tractive-power demand of the vehicle. Transmissions are generally referred to as manually actuated or automatic transmissions. Manual transmissions generally include mechanical mechanisms for coupling rotating gears to produce different ratio outputs to drive the wheels. Automatic transmissions are designed to take automatic control of the frictional units, gear ratio selection and gear shifting.

Recently, there has been a demand to provide an automatic transmission that may be manually shifted in addition to normal automatic transmission operation. Such shifting is typically provided by a shift control mechanism. An example of such a shift control mechanism is disclosed in U.S. Pat. No. 4,905,530 to Stehle et al. This patented shift control mechanism for an automatic transmission includes a selector lever to be operated manually. The selector lever is displaced in a first shifting lane for selecting different transmission speeds during normal operation and transversely in a second shifting lane to manually engage the desired forward speed. However, there is a need in the art to provide a new and improved shift control mechanism.

SUMMARY OF THE INVENTION

It is, therefore, one object of the present invention to provide an improved shift control mechanism for an automatic transmission.

It is another object of the present invention to provide an improved shift control mechanism to manually shift an automatic transmission.

To achieve the foregoing objects, the present invention is a shift control mechanism for an automatic transmission including a housing having a shift control pattern with a longitudinal portion defining a plurality of automatic transmission operating settings and a transverse portion at one end of the longitudinal portion defining a plurality of manual transmission operating settings. The shift control mechanism also includes a shift lever means being manually moved along the shift control pattern for selecting the automatic transmission operating settings and for selecting the manual transmission operating settings. The shift control mechanism further includes switch means actuated by moving the shift lever means in a first direction in the transverse portion to send a signal to manually upshift the automatic transmission and in a second direction in the transverse portion opposite the first direction to send a signal to manually downshift the automatic transmission.

One advantage of the present invention is that a shift control mechanism is provided for an automatic transmission. Another advantage of the present invention is that a shift control mechanism is provided for manually shifting an automatic transmission.

Other objects, features and advantages of the present invention will be readily appreciated as the same becomes better understood after reading the subsequent description taken in conjunction with the accompanying drawings.

DESCRIPTION OF THE PREFERRED EMBODIMENT(S)

Figure 1:
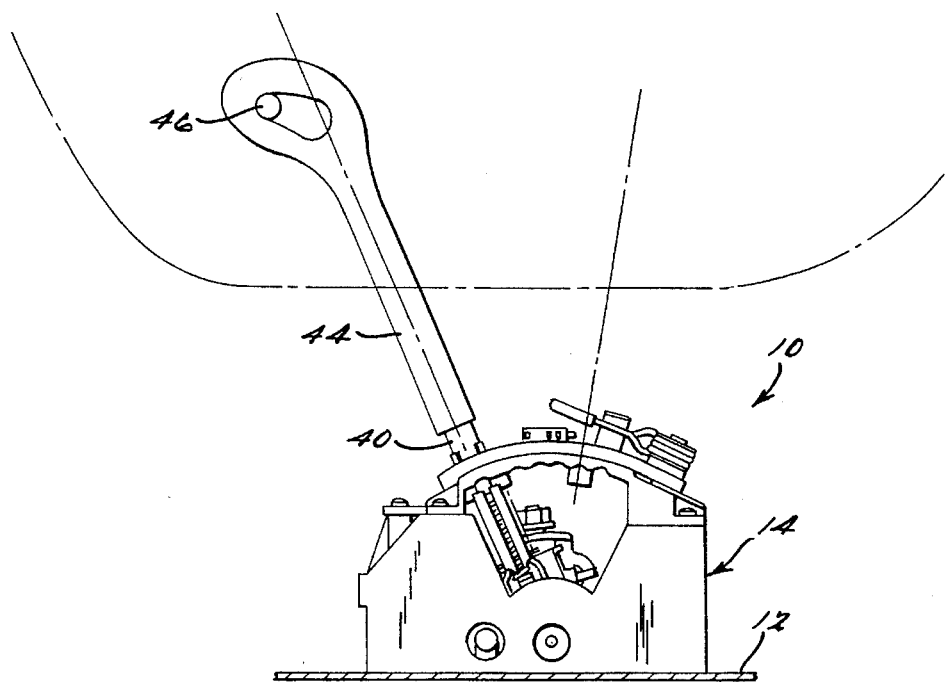
FIG. 1 is an elevational view of a shift control mechanism, according to the present invention, illustrated in operational relationship with vehicle structure.

Referring to FIG. 1, a shift control mechanism 10, according to the present invention, is illustrated in operational relationship with vehicle structure 12 such as a vehicle floor of an automotive vehicle (not shown). The shift control mechanism 10 is operatively connected to each of a cylinder key (not shown) and an automatic transmission (not shown) via cables (not shown). The automatic transmission may be of the type disclosed in U.S. Pat. No. 4,875,391 to Leising et al., the disclosure of which is hereby incorporated by reference. The connections of the shift control mechanism 10 to the automatic transmission and cylinder key are similar to that disclosed in U.S. Pat. No. 5,207,124 to Anderson et al., the disclosure of which is hereby incorporated by reference.

Referring to FIGS. 1 through 4, the shift control mechanism 10 includes a housing, generally indicated at 14. The housing 14 is generally rectangular in shape and has a bottom wall 16. The housing 14 also has a pair of side walls 18 and 20 spaced transversely and a pair of end walls 22 and 24 spaced longitudinally and extending upwardly generally perpendicular to the bottom wall 16. The housing 14 further includes a cover 26 having an arcuate-shaped central portion 28 and generally planar flange portions 30 secured to a top edge of the walls 18, 20, 22, 24 by suitable means such as screws 32. It should be appreciated that the walls 16, 18, 20, 22 and 24 may be integral and formed as one-piece from a plastic material such as by molding.

Figure 2:
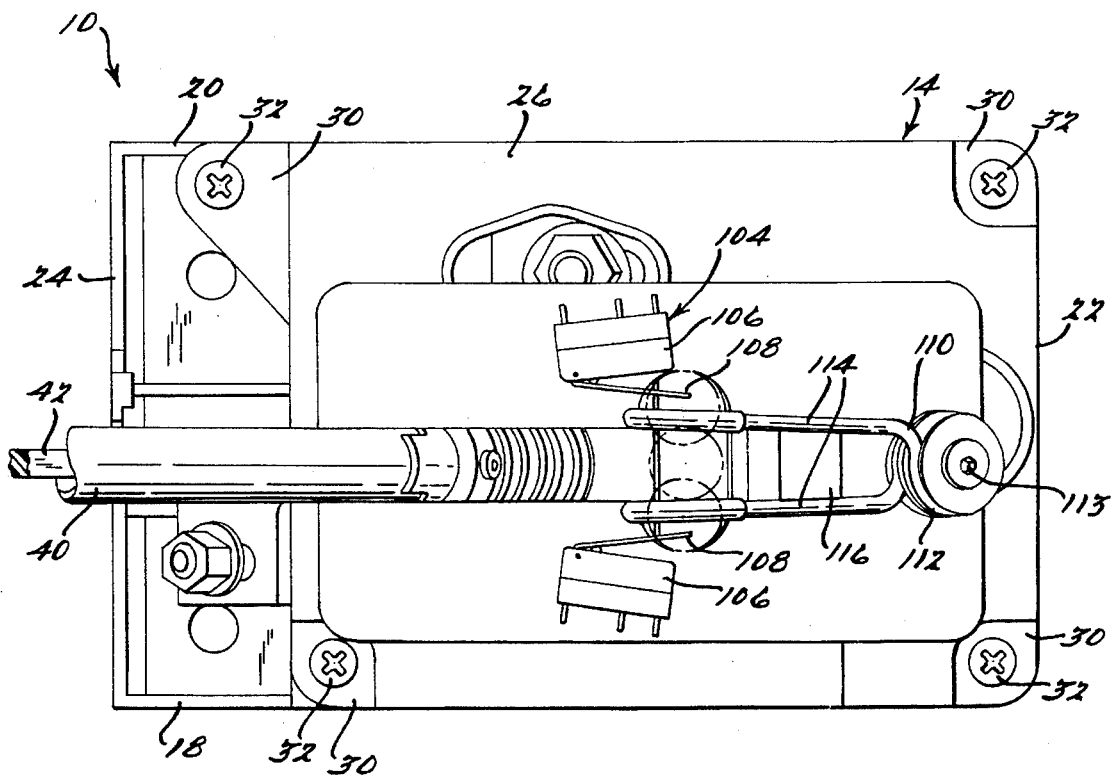
FIG. 2 is an enlarged plan view of the shift control mechanism of FIG. 1.
Figure 3:
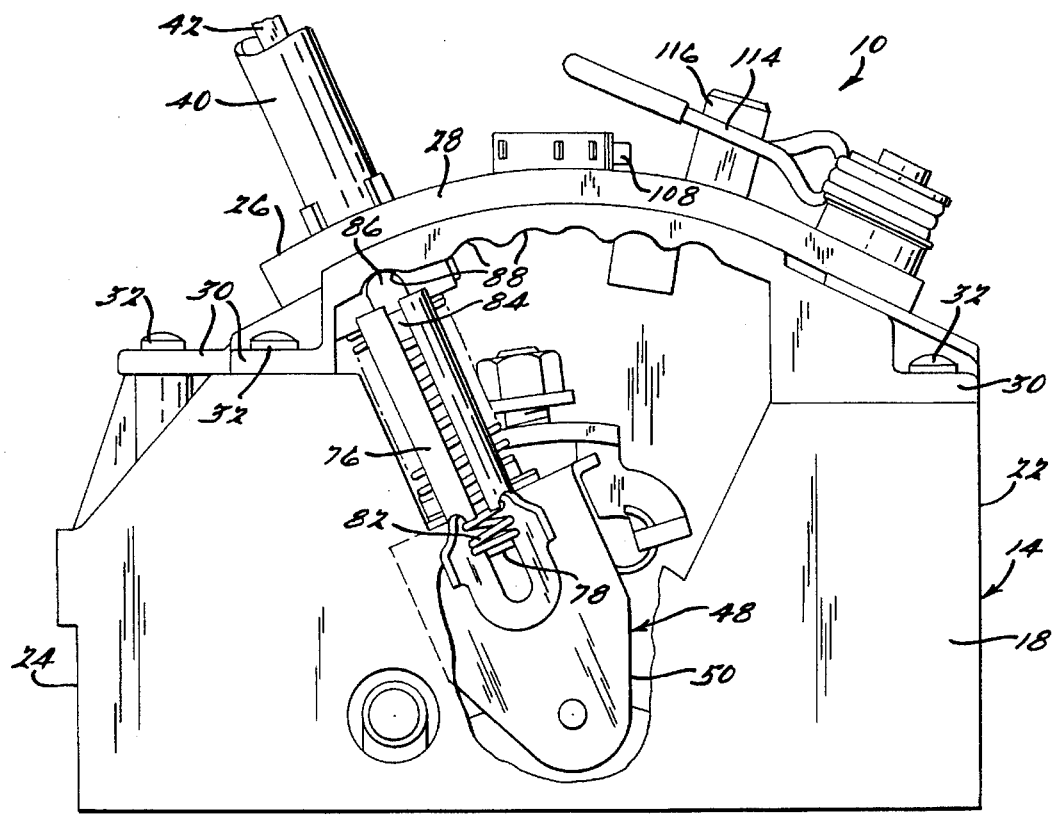
FIG. 3 is a fragmentary side elevational view of the shift control mechanism of FIG. 1.
Figure 4:
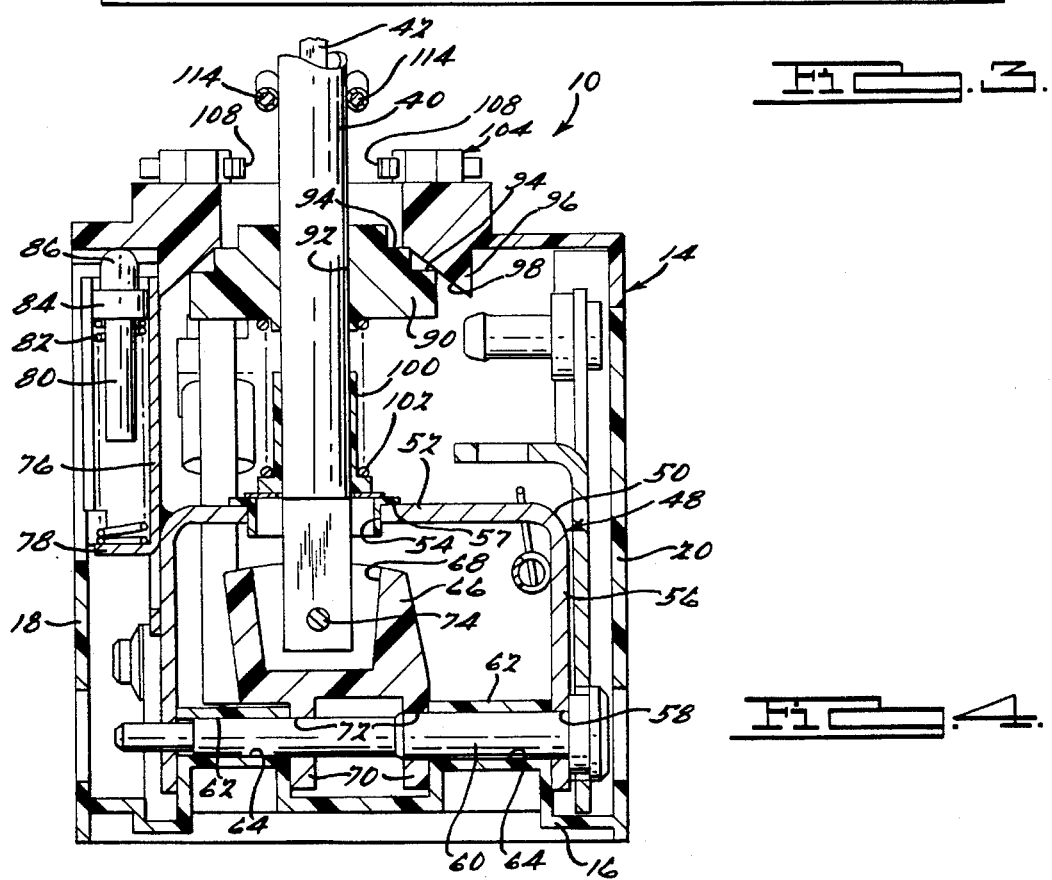
FIG. 4 is a sectional view taken along line 4—4 of FIG. 2 illustrating the shift control mechanism in a first operational position.
Figure 6:
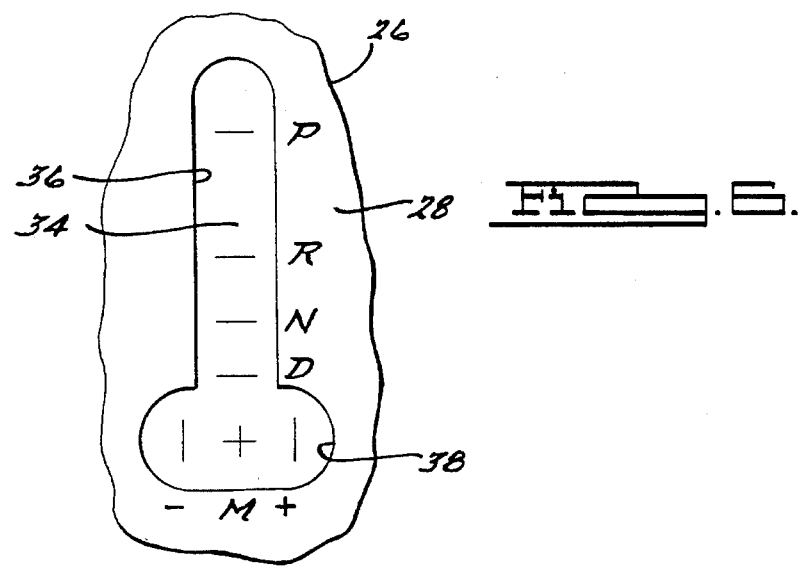
FIG. 6 is a partial plan view of a shift control pattern for the shift control mechanism of FIG. 1.

Referring to FIGS. 2 and 6, the central portion 28 of the cover 26 includes a shift control pattern formed by an inverted and generally T-shaped guide slot 34 extending therethrough. The guide slot 34 has a longitudinal portion 36 with predetermined automatic transmission operating gears or settings such as Park (P), Reverse (R), Neutral (N) and Drive (D) for selecting transmission speeds to be automatically engaged in the automatic transmission during normal automatic transmission operation. The guide slot 34 has a transverse portion 38 at one end of the longitudinal portion 36 with predetermined manual transmission operating settings such as Manual (M), Upshift (+) and Downshift (−) to select and manually shift or engage the desired forward speed during manual operation of the automatic transmission. It should be appreciated that the M setting may be replaced with the D setting and that the automatic transmission may be manually shifted by moving transversely from the D setting to either the + or − setting.

Referring to FIGS. 1 through 4, the shift control mechanism 10 also includes a shift lever 40 to shift the automatic transmission. The shift lever 40 extends through the guide slot 34 in the cover 26 and is manually operated or displaced through the Park (P), Reverse (R), Neutral (N), Drive (D), Manual (M), upshift (+) and downshift (−) settings. The shift lever 40 has a shift rod 42 slidably mounted therein. The shift lever 40 also has a palm abutting knob 44 surrounding the shift lever 40 and a push button 46 extending from the palm abutting knob 44 for a function as described in U.S. Pat. No. 5,207,124 to Anderson et al.

The shift control mechanism 10 further includes a mounting assembly, generally indicated at 48, for pivotally mounting the shift lever 40 within the housing 14. The mounting assembly 48 includes a bracket 50 having an inverted and generally U-shape. The bracket 50 has a generally horizontal base portion 52 with a central opening 54 and leg portions 56 generally perpendicular to and at each end of the base portion 52. The base portion 52 has a bushing 57 disposed in the central opening 54. The leg portions 56 include an opening 58 extending therethrough near a free end thereof. The mounting assembly 48 also includes a pivot pin 60 for pivotally mounting the bracket 50 to the housing 14. The pivot pin 60 is mounted between mounting brackets 62 formed on the bottom wall 16 of the housing 14. The pivot pin 60 extends through the openings 58 of the leg portions 56 and a passageway 64 of the mounting brackets 62. It should be appreciated that the bracket 50 pivots or rotates longitudinally about the pivot pin 60.

The mounting assembly 48 also includes a connecting member 66 for pivotally connecting the shift lever 40 to the pivot pin 60. The connecting member 66 has a cavity 68 to form a generally U-shaped cross-section. The connecting member 66 also has a pair of transversely spaced and downwardly extending flanges 70 with openings 72 extending therethrough. The pivot pin 60 extends through the openings 72 in the flanges 70 to allow the connecting member 66 to pivot or rotate longitudinally about the pivot pin 60. The mounting assembly 48 includes a cross-over pin 74 for pivotally connecting the shift lever 40 to the connecting member 66. The cross-over pin 74 extends through openings in the shift lever 40 and connecting member 66 to allow the shift lever 40 to pivot or rotate transversely about the cross-over pin 74. It should be appreciated that the connecting member 66 allows longitudinal pivotal movement of the shift lever 40 in the longitudinal portion 36 of the guide slot 34 and the cross-over pin 74 allows transverse pivotal movement of the shift lever 40 in the transverse portion 38 of the guide slot 34. It should also be appreciated that the longitudinal portion 36 of the guide slot 34 prevents transverse pivotal movement of the shift lever 40 and guides the shift lever 40 along a predetermined path.

The mounting assembly 48 may include a tubular member 76 with a bottom seat 78 secured to a left end of the bracket 50 by suitable means such as welding. The mounting assembly may also include a detent member 80 slidably mounted in the tubular member 76 and urged upwardly therefrom by a coil spring 87 mounted between the bottom seat 78 and a flange 84 formed around the detent member 80. The detent member 80 has an extended end 86 which is rounded and received in a plurality of rounded indentations 88 are formed in the inner surface of an edge portion of the central portion 28 of the cover 26. A further explanation of the structure and operation may be found in U.S. Pat. No. 5,207,124 to Anderson et al.

The mounting assembly 48 further includes a first guide member 90 having a central opening 92 disposed about the shift lever 40. The guide member 90 has a plurality of steps 94 spaced axially and formed in an outer periphery thereof for a function to be described. The mounting assembly 48 includes a second guide member 96 on an interior surface of the cover 26. Preferably, the second guide member 96 is integral with the cover 26. The second guide member 96 has a cam profile or cooperating surface 98. The steps 94 of the guide member 90 form a generally point contact with the cooperating surface 98 to move therealong. The mounting assembly 48 also includes a retainer bushing 100 disposed about the shift lever 40 and a coil spring 102 disposed about the shift lever 40 between the first guide member 90 and the retainer bushing 100. The coil spring 102 urges the first guide member 90 axially away from the retainer bushing 100. It should be appreciated that the retainer bushing 100 is fixedly secured to the shift lever 40 and the first guide member 90 is slidable along the shift lever 40.

The shift control mechanism 10 also includes a switch assembly, generally indicated at 104, to send signals directly to a transmission controller (not shown) for shifting the automatic transmission. Such a transmission controller is disclosed in U.S. Pat. No. 4,875,391 to Leising et al. The switch assembly 104 includes switches 106 disposed on each transverse side of the slot 36 in the cover 26. The switches 106 are attached to the cover 26 by suitable means. The switches 106 have a spring loaded contact 108 which extends outwardly over the + and − settings of the transverse portion 38. When the shift lever 40 contacts or deflects one of the contacts 108, the switch 106 sends a signal to the transmission controller. The switches 106 are connected by connectors (not shown) and electrical wires (not shown) to the transmission controller. It should be appreciated that the transmission controller executes a command to shift the automatic transmission.

The shift control mechanism 10 further includes a return spring 110 for centering or urging the shift lever 40 to the M setting. The return spring 110 has a coil portion 112 secured to the cover 26 by suitable means such as a fastener 113. The return spring 110 also has a pair of fingers 114 extending longitudinally and spaced transversely by a spacer 116 extending upwardly from the cover 26. The shift lever 40 is disposed between the fingers 114. Alternatively, the return spring 110 may be of the torsional type and disposed about the cross-over pin 74 or a pair of springs of the compression type disposed on opposed sides of the shift lever 40 for centering or urging the shift lever 40 to the M setting.

Figure 5:
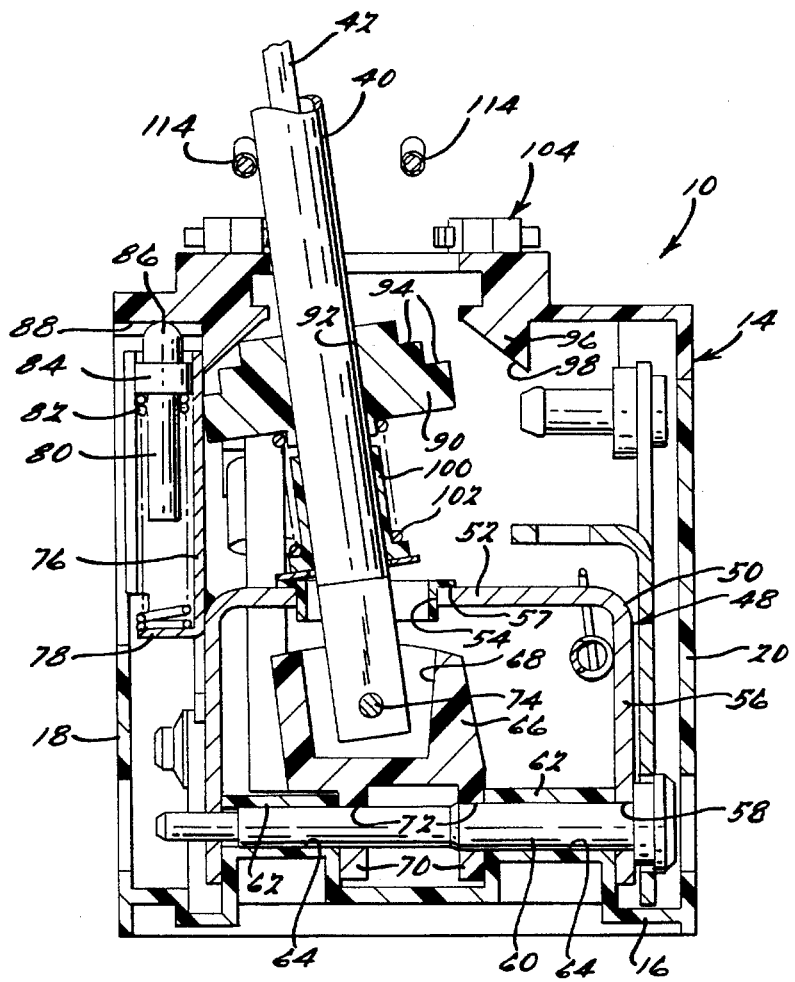
FIG. 5 is a view similar to FIG. 4 illustrating the shift control mechanism in a second operational position.

In operation, the shift lever 40 is moved longitudinally by an operator from the P setting to either the R, N or D setting to allow normal automatic operation of the automatic transmission. When the shift lever 40 is in the D setting, the operator may desire to manually shift the automatic transmission. If so, the shift lever 40 is moved longitudinally by the operator from the D setting to the M setting to allow manual shifting of the automatic transmission. If a downshift is desired, the operator moves transversely the shift lever 40 to the − setting to downshift the automatic transmission. When this occurs, the shift lever 40 contacts and deflects the contact 108 of the switch 106 to send a signal to the transmission controller which then executes a command to downshift the automatic transmission. As illustrated in FIG. 5, the first guide member 90 moves downwardly against the spring 102 and one of the fingers 114 of the return spring 110 is deflected transversely. After the shift lever 40 is moved to the − setting, the operator releases the shift lever 40. When this occurs, the finger 114 moves the shift lever 40 transversely to the M setting and, as the coil spring 102 urges the first guide member 90 upwardly, the steps 94 of the first guide member 90 slide along the cooperating surface 98 of second guide member 96. It should be appreciated that the operation is similar for movement of the shift lever 40 from the M setting to the + setting for an upshift of the automatic transmission.

Accordingly, the shift control mechanism 10 allows an operator to choose complete automatic control of the automatic transmission by leaving the shift lever 40 in the longitudinal portion 36 of the guide slot 34 or can change gears manually by moving the shift lever 40 in the transverse portion 38 of the guide slot 34.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A shift control mechanism for an automatic transmission comprising:

a housing including a shift control pattern having a longitudinal portion defining a plurality of automatic transmission operating settings and a transverse portion at one end of said longitudinal portion defining a plurality of manual transmission operating settings;

shift lever means being manually moved along said shift control pattern for selecting said automatic transmission operating settings and for selecting said manual transmission operating settings;

means for receiving said shift lever means when said shift lever means is disposed in said transverse portion and for centering said shift lever means in said transverse portion; and switch means actuated by moving said shift lever means in a first direction in said transverse portion to send a signal to manually upshift the automatic transmission and in a second direction in said transverse portion opposite said first direction to send a signal to manually downshift the automatic transmission.

2. A shift control mechanism as set forth in claim 1 wherein said shift control pattern comprises a guide slot extending through an upper portion of said housing and said shift lever means extending through said guide slot.

3. A shift control mechanism as set forth in claim 1 wherein said automatic transmission operating settings comprise at least Park (P), Reverse (R), Neutral (N) and Drive (D).

4. A shift control mechanism as set forth in claim 1 wherein said manual transmission operating settings comprise at least an upshift and a downshift.

5. A shift control mechanism as set forth in claim 1 wherein said shift lever means comprises a shift lever being manually moved for displacement thereof.

6. A shift control mechanism as set forth in claim 5 including connecting means for connecting said shift lever to said housing to allow longitudinal pivotal movement of said shift lever and to allow transverse pivotal movement of said shift lever.

7. A shift control mechanism as set forth in claim 6 wherein said connecting means comprises a connecting member, a pivot pin for pivotally connecting said connecting member to said housing for longitudinal pivotal movement of said connecting member, and a cross-over pin pivotally connecting said shift lever to said connecting member for transverse pivotal movement of said shift lever.

8. A shift control mechanism as set forth in claim 1 wherein said switch means comprises at least one switch at one end of said transverse portion.

9. A shift control mechanism as set forth in claim 8 wherein said at least one switch has a contact to cooperate with and contact said shift lever.

10. A shift control mechanism as set forth in claim 1 including guide means for guiding transverse movement of said shift lever.

11. A shift control mechanism for an automatic transmission comprising:

a housing including a shift control pattern having a longitudinal portion defining a plurality of automatic transmission operating settings and a transverse portion at one end of said longitudinal portion defining a plurality of manual transmission operating settings;

a shift lever being manually moved along said shift control pattern for selecting said automatic transmission operating settings and for selecting said manual transmission operating settings;

means extending longitudinally for receiving said shift lever when said shift lever is disposed in said transverse portion and for centering said shift lever in said transverse portion;

connecting means for connecting said shift lever to said housing to allow longitudinal pivotal movement of said shift lever and to allow transverse pivotal movement of said shift lever; and switch means actuated by moving said shift lever in a first direction in said transverse portion to send a signal to manually upshift the automatic transmission and in a second direction in said transverse portion opposite said first direction to send a signal to manually downshift the automatic transmission.

12. A shift control mechanism as set forth in claim 11 wherein said shift control pattern comprises a guide slot extending through an upper portion of said housing and said shift lever extending through said guide slot.

13. A shift control mechanism as set forth in claim 12 wherein said connecting means comprises a connecting member, a pivot pin for pivotally connecting said connecting member to said housing for longitudinal pivotal movement of said connecting member, and a cross-over pin pivotally connecting said shift lever to said connecting member for transverse pivotal movement of said shift lever.

14. A shift control mechanism as set forth in claim 13 wherein said switch means comprises at least one switch connected to said housing at one end of said transverse portion.

15. A shift control mechanism as set forth in claim 14 wherein said at least one switch has a contact to cooperate with and contact said shift lever.

16. A shift control mechanism for an automatic transmission comprising:

a housing including a shift control pattern having a longitudinal portion defining a plurality of automatic transmission operating settings and a transverse portion at one end of said longitudinal portion defining a plurality of manual transmission operating settings;

a shift lever being manually moved along said shift control pattern for selecting said automatic transmission operating settings and for selecting said manual transmission operating settings;

guide means for guiding transverse movement of said shift lever;

connecting means for connecting said shift lever to said housing to allow longitudinal pivotal movement of said shift lever and to allow transverse pivotal movement of said shift lever;

switch means actuated by moving said shift lever in a first direction in said transverse portion to send a signal to manually upshift the automatic transmission and in a second direction in said transverse portion opposite said first direction to send a signal to manually downshift the automatic transmission;

said shift control pattern comprising a guide slot extending through an upper portion of said housing and said shift lever extending through said guide slot;

said connecting means comprising a connecting member, a pivot pin for pivotally connecting said connecting member to said housing for longitudinal pivotal movement of said connecting member, and a cross-over pin pivotally connecting said shift lever to said connecting member for transverse pivotal movement of said shift lever;

said switch means comprising a first switch connected to said housing at one end of said transverse portion and a second switch connected to said housing at the other end of said transverse portion;

said first and second switch each have a contact to cooperate with and contact said shift lever;

return spring means for urging said shift lever to a position between and spaced from said contacts; and said return spring means comprising a spring secured to said housing having a pair of fingers extending outwardly for receiving the shift lever between said fingers.

* * * * *